United States Patent
Yoshikawa et al.

(10) Patent No.: US 7,407,555 B2
(45) Date of Patent: Aug. 5, 2008

(54) OIL TEMPERED WIRE FOR COLD FORMING COIL SPRINGS

(75) Inventors: Hidetoshi Yoshikawa, Nagoya (JP); Tomohiro Nakano, Nagoya (JP); Takayuki Sakakibara, Nagoya (JP); Masami Wakita, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/086,410

(22) Filed: Mar. 23, 2005

(65) Prior Publication Data

US 2005/0161131 A1    Jul. 28, 2005

Related U.S. Application Data

(62) Division of application No. 10/385,656, filed on Mar. 12, 2003, now abandoned.

(30) Foreign Application Priority Data

Jun. 7, 2001 (JP) ............... 2001-172307
Mar. 18, 2002 (JP) ............... 2002-074142

(51) Int. Cl.
*C21D 9/02* (2006.01)
*D02G 3/02* (2006.01)

(52) U.S. Cl. .................. 148/580; 148/595; 57/200

(58) Field of Classification Search ............... 148/568, 148/599, 908, 580, 595; 57/200
See application file for complete search history.

(56) References Cited

U.S. PATENT DOCUMENTS

| | | | |
|---|---|---|---|
| 4,407,683 A * | 10/1983 | Hijikata et al. ............... | 148/568 |
| 4,795,609 A | 1/1989 | Saka et al. | |
| 5,009,843 A * | 4/1991 | Sugimoto et al. ............ | 420/112 |
| 5,665,179 A | 9/1997 | Izawa et al. | |
| 6,235,131 B1 * | 5/2001 | Keihle et al. ................. | 148/580 |

FOREIGN PATENT DOCUMENTS

| | | | | |
|---|---|---|---|---|
| JP | 59096246 | * | 6/1984 | ............... 148/580 |
| JP | 401184234 | * | 7/1989 | ............... 148/568 |
| JP | 05-214484 | | 8/1993 | |
| JP | 09-287056 | * | 11/1997 | |
| JP | A 11-241143 | | 9/1999 | |
| JP | 2000-017388 | | 1/2000 | |
| JP | 2000-326036 | | 11/2000 | |

OTHER PUBLICATIONS

ASM Handbook vol. 1 pp. 131-134 (1990).*

* cited by examiner

*Primary Examiner*—John P. Sheehan
*Assistant Examiner*—Jessee Roe
(74) *Attorney, Agent, or Firm*—Oliff & Berridge, PLC

(57) ABSTRACT

An oil-tempered wire for a cold-formed coil spring having a quality equivalent of or higher than a hot-formed coil spring is provided. A cold-formed coil spring made from the oil-tempered wire is also provided. Material used is the steel which contains, in weight percentage, 0.35 to 0.55% C, 1.8 to 3.0% Si, 0.5 to 1.5% Mn, 0.5 to 3.0% Ni, and 0.1 to 1.5% Cr. The ferrite fraction in the microscopic structure of this material is set to 50% or less. Hot rolled wire is cold drawn with a predetermined reduction of area, and a heat treatment using high frequency induction heating is conducted. It is preferable to set the maximum heating temperature between 900° C. to 1020° C. (favorably 950° C.) and holding time between 5 to 20 seconds. It is preferable to make the oil tempered material to have the grain size number of 9 or more, and the tensile strength from 1830 to 1980 MPa.

8 Claims, 8 Drawing Sheets

Fig. 1

| | C | Si | Mn | P | S |
|---|---|---|---|---|---|
| SWOCV-V | 0.45 -0.55 | 0.15 -0.35 | 0.65 -0.95 | <0.025 | <0.025 |
| SWOSC-V | 0.50 -0.60 | 1.20 -1.60 | 0.50 -0.80 | <0.025 | <0.025 |
| SAE9254 | 0.51 -0.59 | 1.20 -1.60 | 0.60 -0.80 | <0.035 | <0.040 |
| PRESENT INVENTION | 0.35 -0.55 | 1.8 -3.0 | 0.5 -1.5 | <0.01 | <0.01 |

| Cu | Ni | Cr | V | N |
|---|---|---|---|---|
| <0.20 | — | 0.80 -1.10 | 0.15 -0.25 | — |
| <0.20 | — | 0.50 -0.80 | — | — |
| — | — | 0.60 -0.80 | — | — |
| — | 0.5 -3.0 | 0.1 -1.5 | 0.05 -0.5 | 0.01 -0.025 |

Fig. 2

| | C | Si | Mn | P | S |
|---|---|---|---|---|---|
| COMPARATIVE MATERIAL (SAE9254) | 0.50 | 1.52 | 0.65 | 0.011 | 0.009 |
| PRESENT INVENTION | 0.47 | 2.00 | 0.70 | 0.015 | 0.004 |

| Ni | Cr | V | N |
|---|---|---|---|
| — | 0.69 | — | — |
| 0.55 | 0.20 | 0.20 | 0.0125 |

Fig. 10
(a)
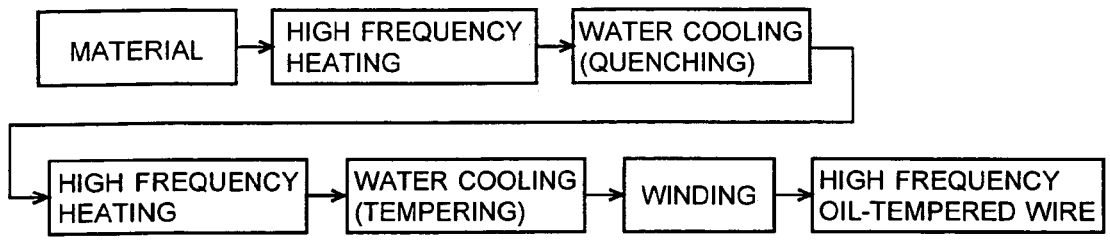
(b)
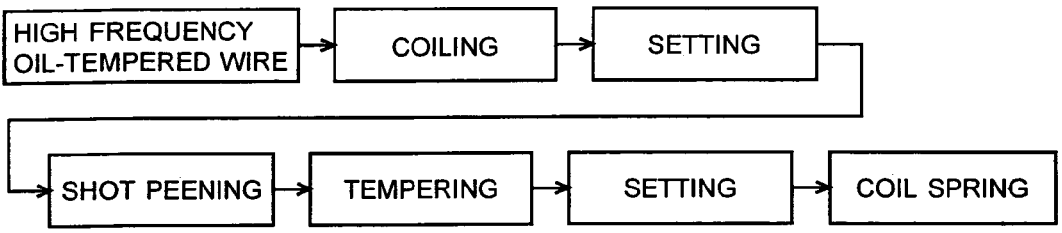
Fig. 11
| WIRE DIAMETER (mm) | COIL DIAMETER (mm) | FREE HEIGHT (mm) | EFFECTIVE NUMBER OF TURNS | SPRING CONSTANT (N/mm) |
|---|---|---|---|---|
| φ11 | φ100 | 311 | 5.29 | 27.2 |

US 7,407,555 B2

OIL TEMPERED WIRE FOR COLD FORMING COIL SPRINGS

This is a Divisional of application Ser. No. 10/385,656 filed on Mar. 12, 2003. The entire disclosure of the prior application is hereby incorporated by reference herein in its entirety.

TECHNICAL FIELD TO WHICH THE INVENTION PERTAINS

The present invention relates to an oil-tempered wire used for a cold-formed coil spring, and a cold-formed coil spring made of oil-tempered wire.

PRIOR ART

A demand for better fuel efficiency in automobiles is rising these days from the viewpoint of conservation of natural resources, as well as environmental concerns. One of the targets under scrutiny is weight reduction of the suspension springs which are relatively heavy among automotive parts. The weight reduction has continuously been demanded, and has mainly been achieved by increasing the working strength of the spring. For increasing the working strength of the spring, it is necessary to strengthen or harden the material. Hence, hardening of the material has been the major strategy for the weight reduction.

This strategy, however, might create the negative effect on corrosion fatigue. Therefore, a high-strength hot-formed coil spring of reduced weight and having good corrosion fatigue strength has been developed and is used. One example is a spring made from steel with a lower carbon content and a slightly higher silicon content (Publication-No. 11-241143 of Japanese unexamined patent application).

At the same time, for the material of cold-formed coil springs, mainly small springs, SAE (Society of Automotive Engineers) 9254 steel has been used, where it underwent a high frequency induction heating process (hereafter called "short period heat treatment"). The short period heat treatment is characterized by quick and short time heating by means of direct heating (self heating) using high frequency induction heating, which provides advantages such as fine structures and grains as well as minimum decarburization.

PROBLEMS TO BE SOLVED BY THE INVENTION

The above-mentioned steel with lower carbon content and higher silicon content demonstrates high-performance in a hot-formed coil spring when an appropriate heat treatment is conducted. However, it is difficult to conduct a sufficient heat treatment with a short period heat treatment using induction heating. Therefore, it is difficult for the spring to demonstrate equivalent performance of a hot-formed coil spring.

After high-committed investigations, we have found conditions of high frequency induction heating suitable for steel with lower carbon content and higher silicon content. These conditions make it possible that an oil-tempered wire for a cold-formed coil spring, and a cold-formed coil spring made from an oil-tempered wire demonstrate higher performance than a hot-formed coil spring.

MEANS FOR SOLVING THE PROBLEMS

An oil-tempered wire for a cold-formed coil spring according to the present invention is made from steel containing, in weight percentage, 0.35 to 0.55% C, 1.8 to 3.0% Si, 0.5 to 1.5% Mn, 0.5 to 3.0% Ni, 0.1 to 1.5% Cr, and is characterized by being processed with a heat treatment using high frequency induction heating.

In addition, the steel may further contain, in weight percentage, 0.01 to 0.025% N and 0.05 to 0.5% V, and P content is limited to 0.01% or less P, and S content to 0.01% or less.

Before conducting the above-mentioned high frequency induction heating, it is preferable to conduct wire drawing at a predetermined reduction of area by cold-forming on a wire manufactured with hot-formed rolling. By doing this, it is preferable to restrict the ferrite fraction in the micro-structure of the steel to 50% or less. In addition, by conducting the heating, it is preferable to set the maximum heating temperature to be within the range of 900 to 1020° C. It is preferable to set the holding time at the maximum heating temperature to be within 5 to 20 seconds. And it is preferable to make the grain size number of the oil-tempered material to be 9 or more, and set the tensile strength from 1830 to 1980 MPa.

BRIEF DESCRIPTION OF THE DRAWINGS

FIG. 1 is a table showing the composition range of the material of the present invention, and conventional materials for oil-tempered wire and cold-formed coil spring.

FIG. 2 is a table showing the chemical compositions of the material of the present invention and the comparative steel used in tests.

FIG. 10 is a manufacturing process chart of sample oil-tempered wires and cold-formed coil springs.

FIG. 11 is a table of the dimensions of sample springs.

MODE FOR CARRYING OUT THE INVENTION

Figure 3:
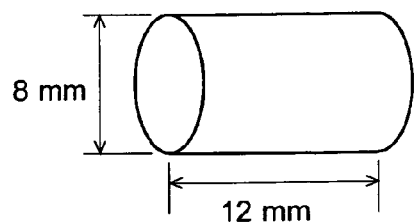
FIG. 3 is a diagram showing the shape and dimensions of a specimen used in basic heat treatment tests.

Steel used as the material of the present invention is almost the same as that described in the above-mentioned Publication No. 11-241143 of Japanese unexamined patent application. The basic idea of the design of the ingredients is, as mentioned in the patent publication, to improve the corrosion fatigue strength.

In general, sag effectively decreases when the hardness of the material is increased. And under ideal conditions, although there is a certain limit, an increase in the hardness of the material leads to an enhancement of the fatigue resistance. However, since automotive suspension springs, for example, are installed at such places where water or mud easily attaches to, the problem of corrosion must be considered first for the actual use. This is because corrosion generates pits (micropits) on the spring surface, and they become the origin of fatigue fracture.

The main causes of fracture by corrosion fatigue are: (1) the delayed-fracture phenomenon of steel, (2) generation of surface pits (micro-pits) by corrosion, and (3) a decrease in the residual stress due to long-term use.

The delayed-fracture, which is peculiar to high-strength steels, is a phenomenon where hydrogen atoms from moisture on the surface or vapor in the air enter into the steel, and are accumulated at the irregular part of the grain boundary or the boundary between precipitates and matrix, which increases the pressure, resulting in generating a micro crack and finally fracture. Materials used for various springs have been strengthened especially in recent years, and are subjected to a higher working stress than conventional materials. They are also used under situations that, as mentioned above, moisture or other forms of water easily attaches to it. Therefore the delayed-fracture property of the material has to be considered first when an improved corrosion fatigue strength is sought.

Stress is concentrated on a surface pit generated by corrosion, which greatly decreases the fatigue resistance. One way to avoid this is not to generate pits as possible, or to generate a pit in a form in which the stress concentration is minimized. At the same time it is important to adopt measures in the material to produce strength against cracking in the presence of pits.

Residual stress of a spring is endowed by a shot peening operation. In detail, when the surface is deformed by the shot peening, the difference in the deformation between the deformed surface layer and the undeformed subsurface layer causes strain and residual compression stress on the surface. When the surface layer is removed by corrosion, or when a micro crack is generated on the surface, the strain and the residual stress decrease.

The ranges of the compositions were determined considering the circumstances mentioned above, and the lower and upper limits of the respective composition range were specified for the following reasons.

C content is set lower than that of the JIS-SUP 7 steel, which is the most common material used for hot-formed coil springs, or the material of various oil-tempered wires. This is because, with the same hardness (strength), the toughness of material with lower C content and higher alloying element content is better than that of material with higher C content. When the toughness is improved, the occurrence of fatigue cracks from corrosion pits is decreased, the growing speed of the cracks is lowered, and the corrosion fatigue strength is improved, which is an object of the present invention. The lower limit of C content is set to 0.35% because, with less content, it is difficult to obtain the above-mentioned hardness after the heat treatment even when other alloying elements are maximized. The upper limit of C content is set to 0.55% because, with more content, the toughness of the material greatly deteriorates.

Si is known to be effective to enhance the sag resistance. Therefore, the upper limit of Si content is set higher than that of conventional steels to improve sag resistance. On the other hand, Si promotes the surface decarburization of steels. If Si content is set to more than 3.00%, decarburization by a heat treatment becomes significant. In such a case it is difficult to obtain the above-mentioned hardness and the residual stress on the surface. Therefore the upper limit is set to 3.00%.

Mn is effective in improving hardenability. Exercising a thorough quenching and tampering all the way to the center of a spring is crucial in obtaining the full effect of alloying elements, such as Ni, in improving the toughness. The lower limit is set to 0.5%, because an adequate hardening cannot be obtained on a spring with a large diameter when the Mn content is less than 0.5%. However, if the Mn content is set to more than 1.5%, the hardenability enhancing effect is saturated and the toughness tends to decrease on normal size springs. Therefore the upper limit is set to 1.5%.

Ni is effective to improve toughness and to suppress steel corrosion. As mentioned above, suppression of corrosion enhances the corrosion fatigue strength by blocking the occurrence of corrosion pits and preventing a decrease in the residual stress. This effect of Ni can only be obtained when the Ni content is 0.5% or more. However, if the Ni content is set to more than 3%, the effect of improving toughness is saturated. In addition, since Ni is an austenite-stabilizing element, the amount of residual austenite increases after quenching, which means that the transformation to martensite is incomplete. Moreover, it increases the cost of a spring because the element is expensive. Therefore the upper limit is set to 3.0%.

Cr is effective in improving hardenability like Mn, and it is also effective in suppressing surface decarburization. The lower limit is set to 0.1% because such effects are hardly obtained with a Cr content of under 0.1%. On the other hand, if the Cr content is set to more than 1.5%, the effect is saturated, and an adverse effect arises that it brings about a heterogeneous microstructure of the steel after tempering. Therefore the upper limit is set to 1.5%.

N bonds to Al in steel to become AlN, which precipitates into steel as fine particles. Because this prevents grains from growing, N is very effective in reducing the size of (or refining) grains in steel. To obtain this effects it is necessary that the N content is set to 0.01% or more. However, if the N content is excessive, the quality of steel deteriorates since N generates $N_2$ gas when the steel is manufactured (solidified and cooled). Therefore the upper limit is set to 0.025%.

V bonds to C to become VC (vanadium carbide), which precipitates into steel as fine particles. It increases the toughness of the steel by refining grains as in the case of AlN. Dispersing these fine carbide particles in steel prevents H (hydrogen) entering from outside from accumulating at certain limited locations, and prevents the above-mentioned delayed-fracture from occurring. To obtain this effect, it is necessary that the V content is set to 0.05% or more. However, when the V content is set to more than 0.5%, the effect is not obtained because the VC only grows without increasing the number of VC precipitation. Therefore, the upper limit is set to 0.5%.

P decreases toughness of steel. Therefore, by limiting the content to 0.01% or less, the toughness of the material is improved, and the corrosion fatigue strength of the spring according to the present invention increases. Because the present invention relates to a cold-formed coil spring, it is very important to increase toughness.

S bonds to Mn to become MnS, which is insoluble in steels. MnS is easy to deform, and is drawn and elongated by rolling, etc. The elongated MnS tends to be the origin of fracture by mechanical impacts or fatigue. Therefore the upper limit of S content is set to 0.01% in the present invention. This brings about a toughness and fatigue resistance of the steel at a higher hardness equivalent to those of conventional material.

FIG. 1 shows the composition range of: the oil-tempered chrome vanadium alloy steel wires for valve springs specified in the JIS (Japanese Industrial Standard) (SWOCV-V: JIS G3565), the oil-tempered silicon chrome steel wire for valve springs (SWOSC-V: JIS G3566), the SAE (Society of Automotive Engineers) 9254 steel which has been widely used as a material of cold-formed coil springs for a small spring, and the material of the present invention. As is obvious from the table, an oil-tempered wire according to the present invention contains a lower carbon content and a remarkably higher silicon content compared to the conventional oil-tempered wire or cold-formed coil spring steel. This makes the austenitic transformation temperature (Ac3 temperature) of the steel higher. Therefore it is necessary to set appropriate conditions to a high frequency induction heat treatment which is generally short period heating.

For the above reason, we decided to conduct wire drawing with a predetermined reduction of area before the material is heat treated, and to set the ferrite fraction in the microstructure to 50% or less. Owing to these treatments, sufficient austenitizing is done even with the high frequency induction heating, and it is possible to obtain the equivalent performance to the above-mentioned hot-formed coil spring.

Sufficient austenitization with a short period heat treatment can be achieved by increasing the heating temperature. However, a too high heating temperature coarsens the austenitic grain size, and may decrease the steel toughness. Therefore, in the present invention, the maximum heating temperature in the high frequency induction heating was controlled to 1020° C. or lower, or preferably 950° C. or lower. At a temperature of 900° C. or lower, sufficient austenitization may not be obtained. Based on the results of the below-mentioned basic tests, the holding time at the maximum heating temperature which greatly affects the austenitizing and coarsening of the grain size, is set within the range of 5 to 20 seconds in the present invention.

By conducting a heat treatment on the steel whose component range is mentioned above, the coarsening of grain size can be decreased, and by setting the grain size number to 9 or more, the quality of a cold-formed coil spring is assured (especially to corrosion fatigue resistance).

On the one hand, there is a case that a ferrite decarburized layer exists on the surface of the material before heating. This ferrite-decarburized surface layer of the material is usually passed onto the spring, which greatly decreases the fatigue resistance. Hence, when the ferrite decarburized layer exists on the surface of the material before heating, it is preferable to set the maximum heating temperature in the high frequency induction heating to 940° C. or more. This decreases the depth of the surface decarburization layer of material, or avoids it totally.

Tensile strength is set to 1830 to 1980 MPa, because with less strength it does not meet the durability requirement for suspension springs, and with more strength the toughness greatly decreases.

EMBODIMENTS

The results of basic tests conducted to determine the condition of a heat treatment is described. The SAE9254 steel conventionally used for cold-formed coil springs was included in the basic tests as the comparative material. Steel with the compositions shown in FIG. 2 is melted, and small specimens as shown in FIG. 3 are prepared. Heat treatment is conducted with the heating pattern shown in FIG. 4 which simulates quenching.

Figure 4:
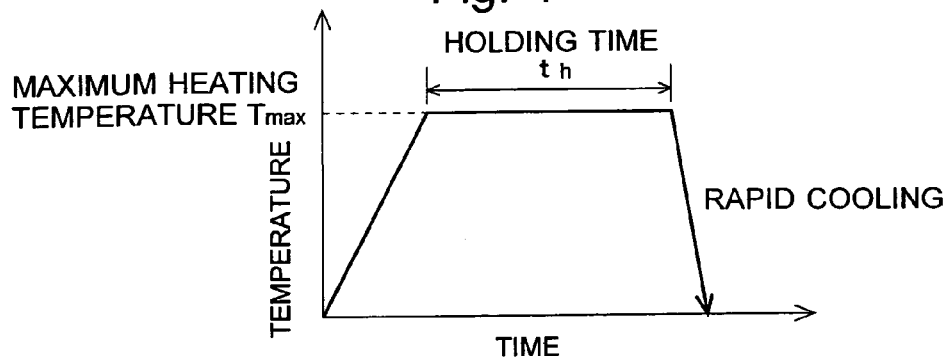
FIG. 4 is a diagram showing the heating pattern of a heat treatment conducted in basic heat treatment tests.

First, heat treatments according to the heating pattern of FIG. 4 are conducted with varying maximum heating temperatures within the range of 900° C. to 980° C. with an increment of 20° C. The holding time at the maximum temperature is set to 5, 10 and 20 seconds. After the heat treatments, the internal hardness (Hv 20 kg) and the austenitic grain size number (JIS-G0551) of the specimens were measured. The result is shown in the TTA (Time-Temperature-Austenitizing) diagram of FIG. 5.

Figure 5:
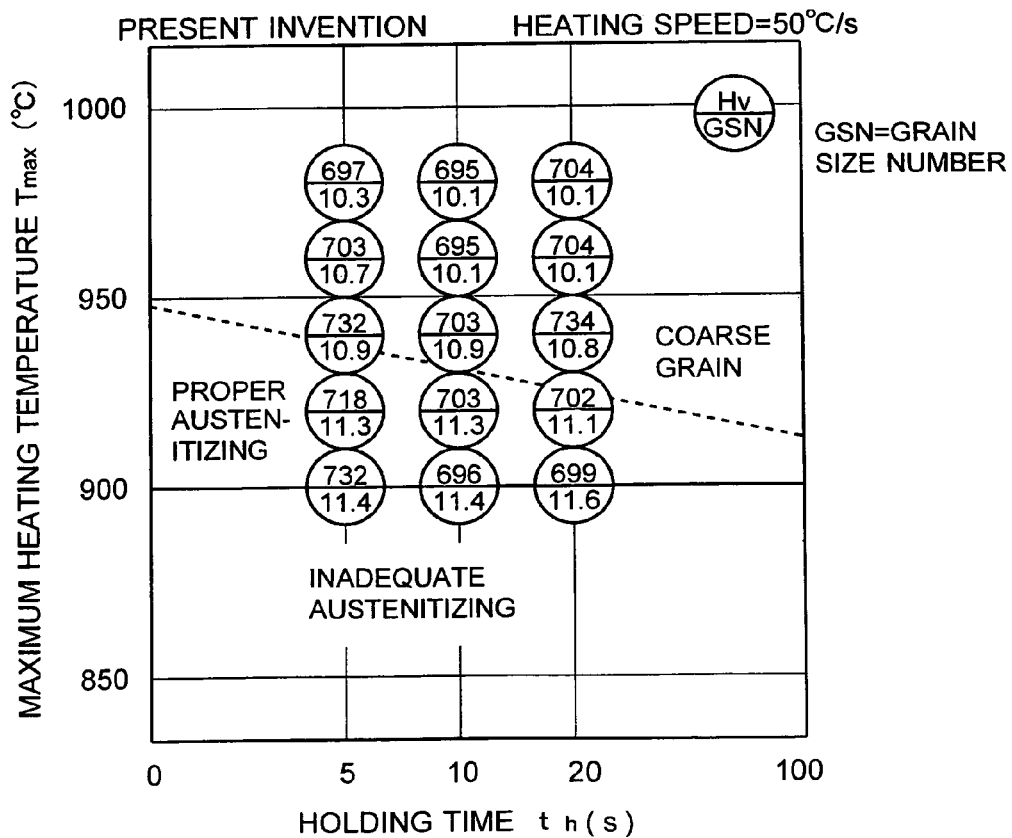
FIG. 5 is a TTA diagram showing the results of basic heat treatment tests using the material of the present invention.

In FIG. 5, no marked difference can be found in the internal hardness and austenitic grain size number with the variation of the maximum-temperature holding time within the range of 5 to 20 seconds. This indicates that, within such range of maximum-temperature holding time, the holding time has little effect on the short period heat treatment.

As to the heating temperature, on the other hand, the internal hardness is not affected so much by the rise in the heating temperature, but the grain size number is revealed to decrease (the grains coarsen) as the heating temperature rises.

Figure 6:
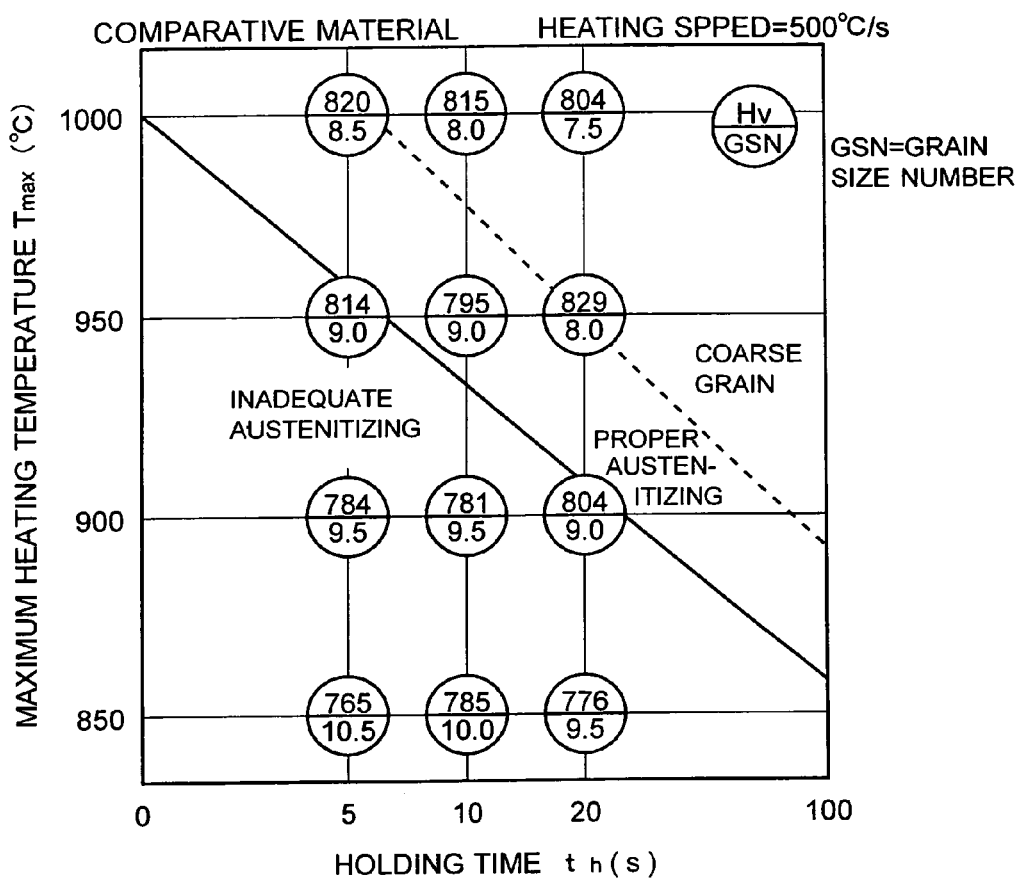
FIG. 6 is a TTA diagram showing the results of basic heat treatment tests using the comparative material.

FIG. 6 shows similar results of SAE9254 steel, or the comparative material, derived from Kawasaki, et al., "Heat Treatment", The Japan Society for Heat Treatment 20, 1980, pp. 281-288. The heating speed of the two diagrams differs, and the change in the austenitic transformation temperature (Ac3 temperature) due to the heating speed difference is estimated to be about 10° C., where the comparative material with the larger heating speed has a higher Ac3 temperature. Taking this into account, the austenitic grain size number of the material of the present invention is larger (or finer) by 2 points. This effect can be ascribed to the high Ac3 temperature of the material of the present invention and the pinning effect of fine vanadium carbides included in the material of the present invention.

Figure 7:
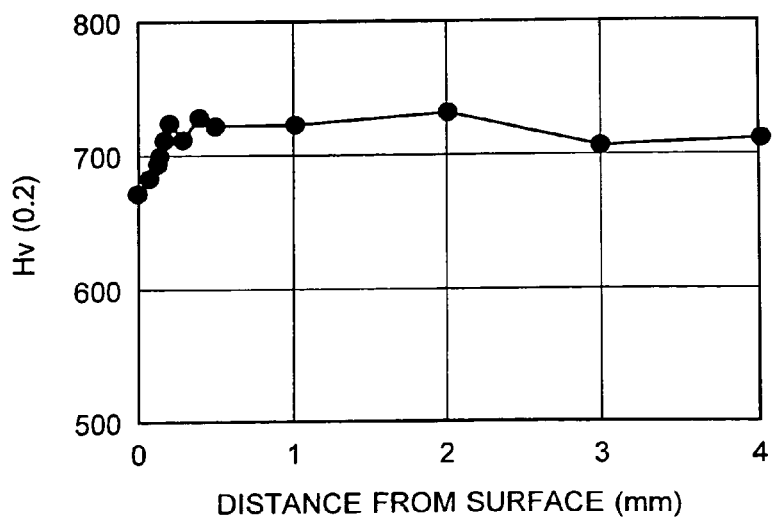
FIG. 7 is a graph showing the internal hardness distribution of the material of the present invention austenitized under the severest condition.

FIG. 7 shows the hardness distribution obtained under the maximum heating temperature of 900° C. and the holding time of 5 seconds, which is the severest austenitizing condition in the TTA diagram of FIG. 5. Under this severest condition, a uniform internal hardness is obtained in the material of the present invention. It was also confirmed that the microscopic structure showed normal martensite structure all the way to the center.

Figure 8:
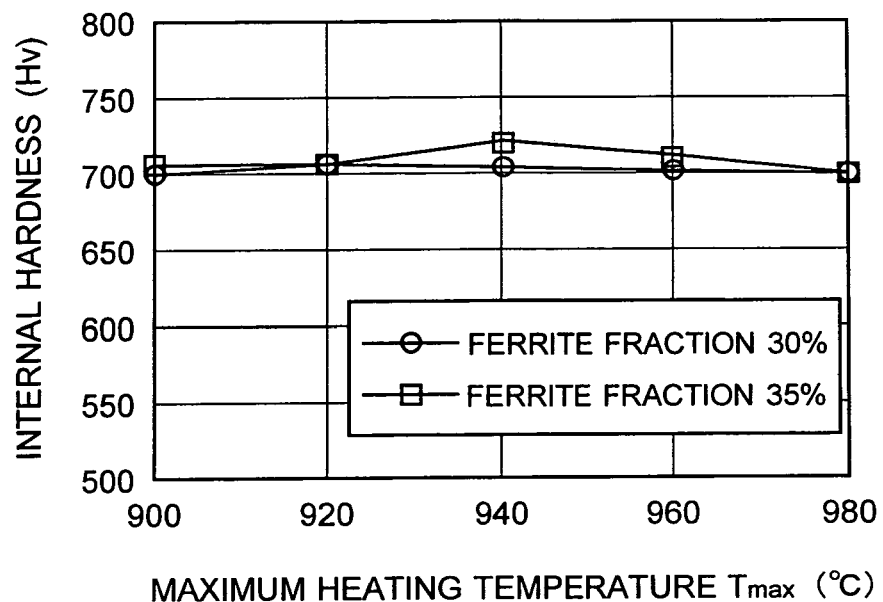
FIG. 8 is a graph showing the relationship between the maximum heating temperature and the internal hardness with different ferrite fractions before heat treatments.
Figure 9:
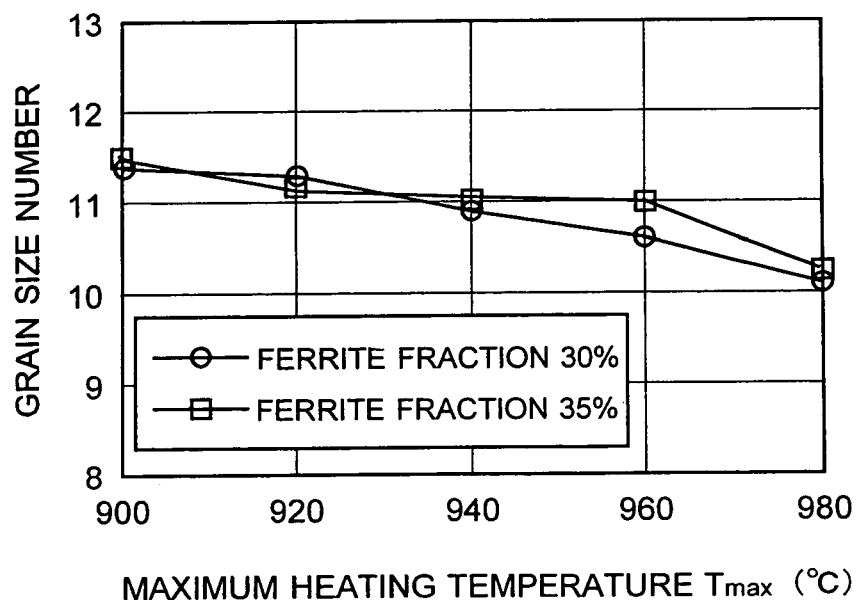
FIG. 9 is a graph showing the relationship between the maximum heating temperature and the grain size number with different ferrite fractions before heat treatments.

In order to assess the effect of the microscopic structure before a high frequency induction heating (especially the ferrite fraction) on a short period heat treatment, specimens with 30% ferrite fraction and 35% ferrite fraction are prepared from the material of the present invention by giving them appropriate heat treatments. After conducting heat treatments according to the pattern shown in FIG. 4 on these specimens with the maximum heating temperature of 900° C. to 980° C. and holding time of 5 seconds, the internal hardness and austenitic grain sizes were measured. As shown in FIGS. 8 and 9, it is confirmed that the microscopic structure of specimens with 50% or less ferrite fraction before heat treatment have little effect.

Figure 17:
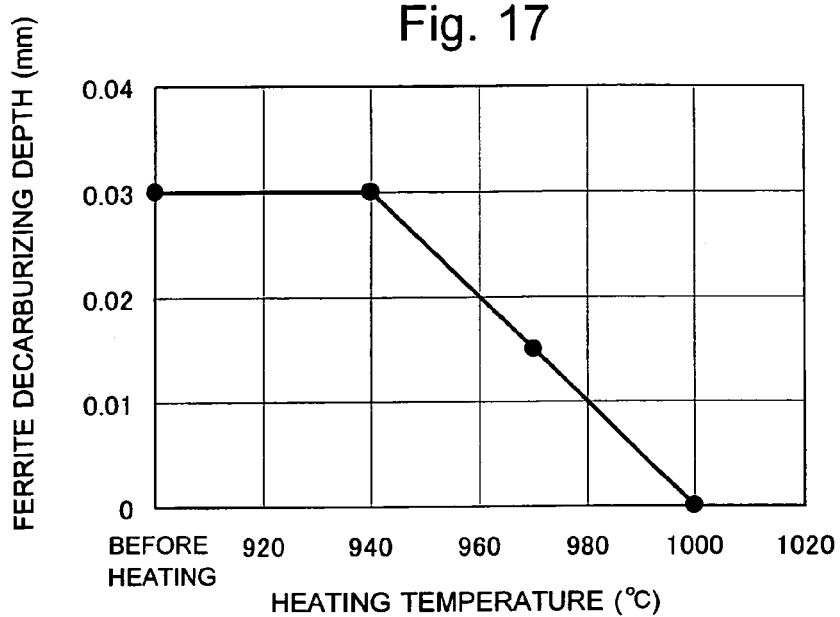
FIG. 17 is a graph showing the relationship between maximum heating temperatures and ferrite decarburizing depths.
Figure 18:
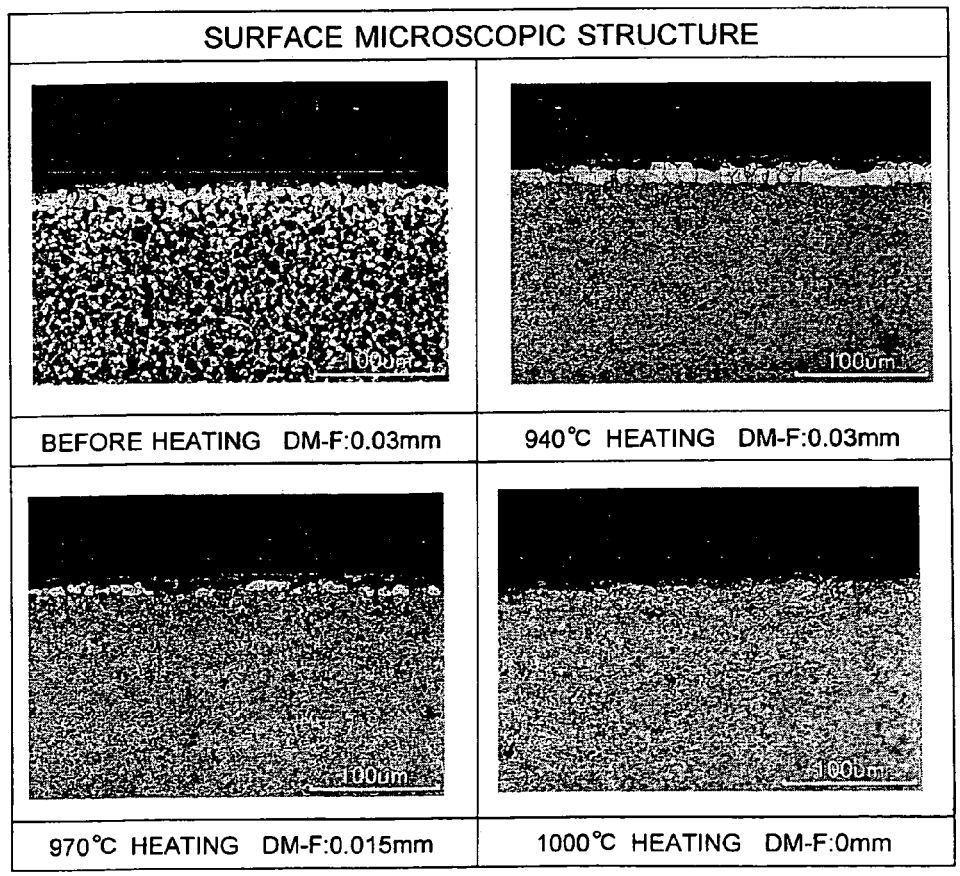
FIG. 18 are photos of the surface microscopic structure showing the relationship between the maximum heating temperatures and the ferrite decarburizing depths.

In order to assess the relationship between the surface ferrite decarburization and the heating temperature of high frequency induction heating, specimens are prepared from the material of the present invention with the surface ferrite-decarburized layer of 0.03 mm. After conducting heat treatments according to the pattern shown in FIG. 4 on these specimens with the maximum heating temperatures of 900° C. to 1000° C. and the holding time of 17.5 seconds, the depths of surface ferrite decarburized layer were measured. As shown in FIGS. 17 and 18, the surface ferrite decarburized layer existed before heating remained at the heating temperature of 940° C., fell by half to 0.015 mm at 970° C., and almost disappeared at 1000° C.

This is explained as follows. Although surface ferrite decarburized layer exists in the material before heating, conducting a short period heat treatment at a higher temperature than usual makes the carbon in the material diffuse and dissolve into the surface ferrite layer, and then makes the surface ferrite decarburized layer thin or disappear. High frequency induction heating has been known to have the advantage of causing less surface decarburization owing to its quick and short period heating. The inventors confirmed that by conducting the heating under the condition specified by the present invention, already existing decarburization can disappear and even carbon restoration in the layer is possible.

Based on these basic tests, fatigue resistance tests on coil springs were conducted. From the material of the present invention, an oil-tempered wire was made by high frequency heating using the process shown in FIG. 10(a). Then from the oil-tempered wire, coil springs were produced using the process shown in FIG. 10(b). Coiling was conducted by cold-forming. The dimensions of the produced coil springs are shown in FIG. 11. From the comparative material, an oil-tempered wire was made by a furnace heating, and from the oil-tempered wire, coil springs of the same dimensions were produced by hot-forming.

Figure 12:
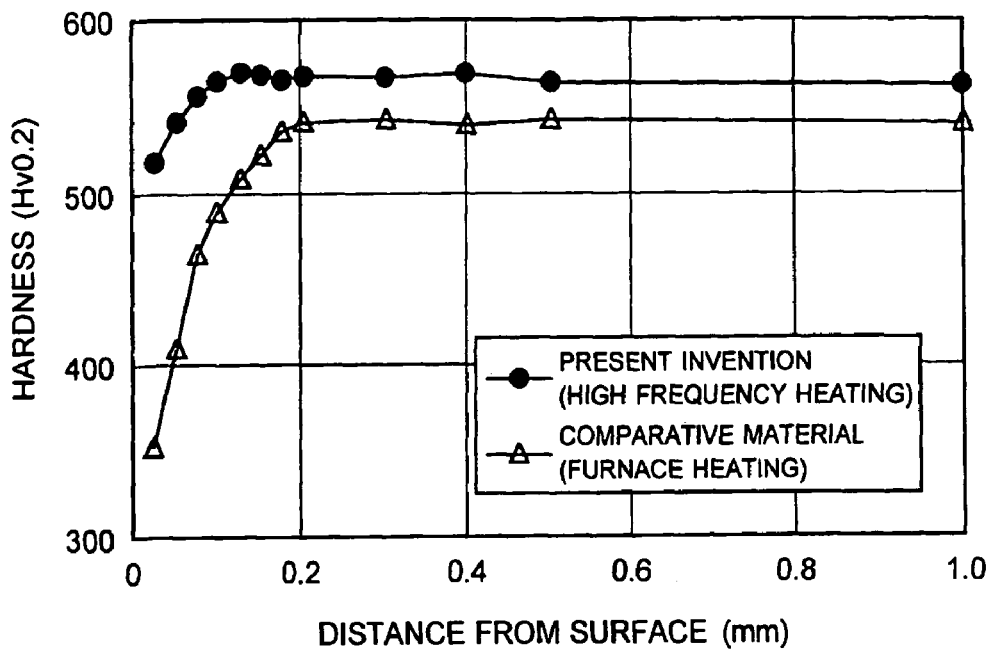
FIG. 12 is a graph showing the surface hardness distribution of the material of the present invention and the comparative material in the state of oil-tempered wire.

After the process of FIG. 10(a), the surface hardness distributions of the oil-tempered wires were measured. As shown in FIG. 12, the decrease in the hardness due to surface decarburization is minimized in the material of the present invention on which high frequency heating was conducted.

Figure 13:
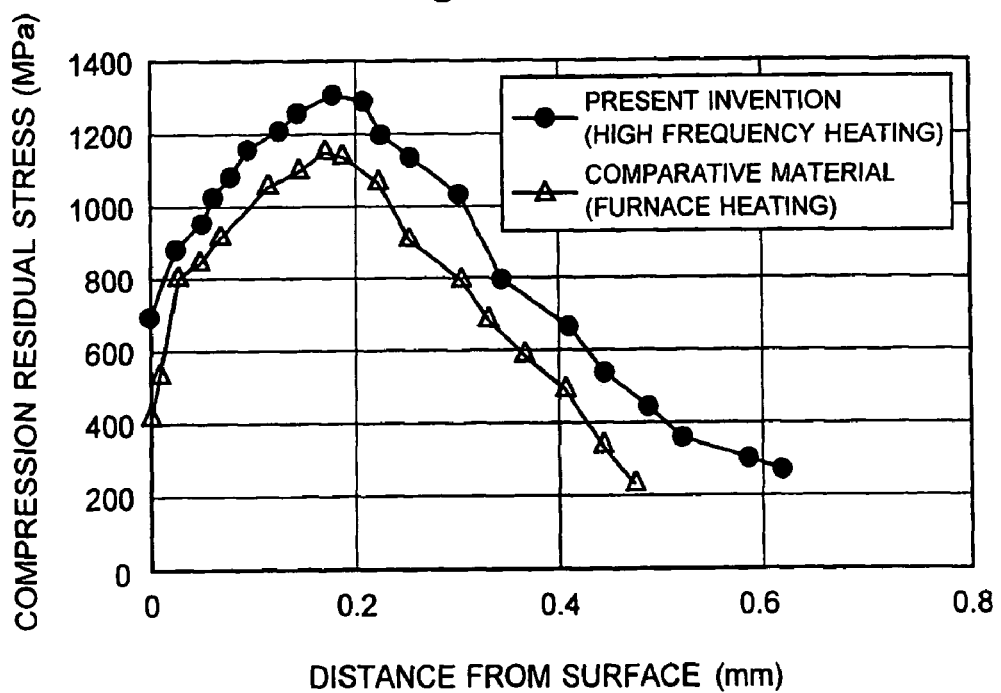
FIG. 13 is a graph showing the surface compression residual stress distribution of the material of the present invention and the comparative material in the state of coil spring.

Distribution of the surface compression residual stress of the coil springs produced by the process of FIG. 10(b) is shown in FIG. 13. The residual stress of the material of the present invention is larger at any depths by about 100 to 200 MPa than that of the comparative material. This suggests the effect of the surface decarburization shown in FIG. 12.

Figure 14:
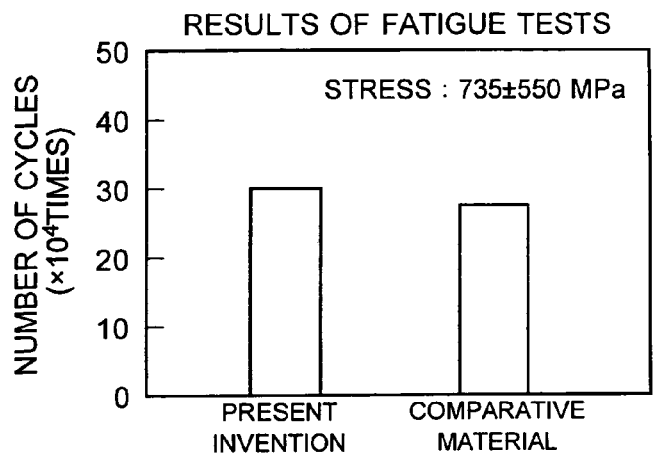
FIG. 14 is a graph showing the results of fatigue tests on the material of the present invention and the comparative material.

Fatigue resistance tests on the coil springs made from the material of the present invention and coil springs made from the comparative material were conducted under the condition of the average stress of τm=735 MPa, and the stress amplitude of τa=550 MPa. As shown in FIG. 14, it is confirmed that the material of the present invention has the durability of 300,000 times, which is nearly equivalent to the comparative material which has the durability of 280,000 times.

Figure 15:
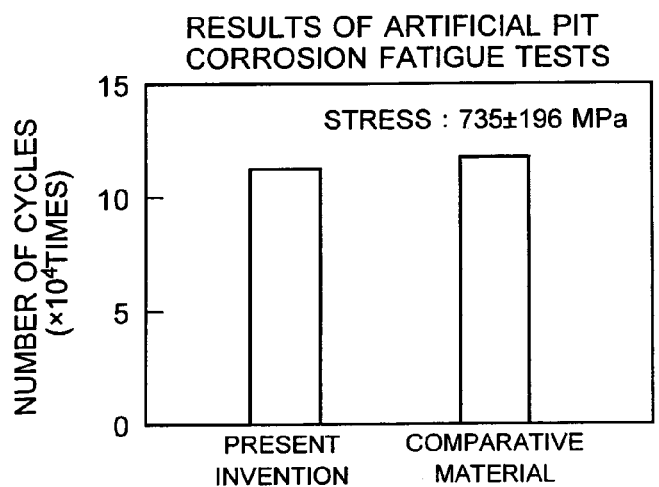
FIG. 15 is a graph showing the results of artificial pit corrosion fatigue tests on the material of the present invention and the comparative material.

Next, corrosion fatigue tests were conducted. Pits of 0.4 mm were formed on the surface of the springs, and then the springs was subjected to corrosion by salt water. The fatigue test was conducted under the condition of the average stress of τm=735 MPa, and the stress amplitude of τa=196 MPa. As shown in FIG. 15, it is confirmed that the material of the present invention has nearly the equivalent corrosion fatigue properties to the comparative material.

Figure 16:
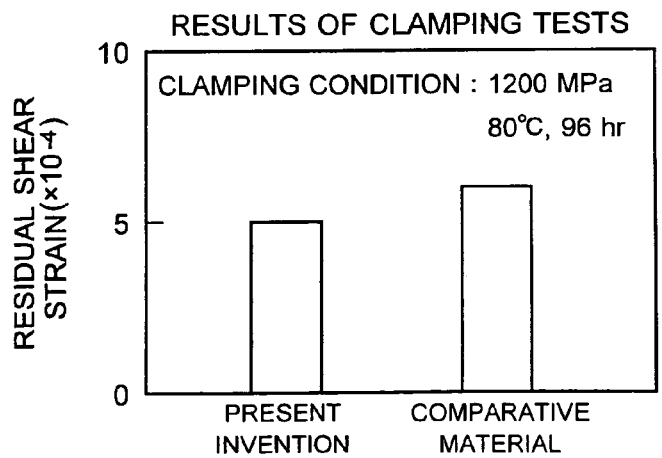
FIG. 16 is a graph showing the results of clamping tests on the material of the present invention and the comparative material.

Finally, sag resistance tests were conducted. Sample coil springs were clamped to yield the maximum shear stress of 1200 MPa on the surface, and were placed in the temperature of 80° C. for 96 hours, whereby sag is caused. The residual shear strain on the surface is calculated from the difference in the free height before and after the sag resistance tests. FIG. 16 shows the results. The material of the present invention showed slightly better result than the comparative material as for the sag resistance. This suggests that the higher silicon content, as well as the controlled microscopic structure before heat treatment, has brought about the result.

Thus, the material for cold-formed coil springs having equivalent comparable quality to materials for hot-formed coil spring.

The invention claimed is:

1. A method of producing a steel wire for a cold-formed coil spring comprising the steps of:
    providing a steel material comprising, in weight percentage, 0.35 to 0.55% C, 1.8 to 3.0% Si, 0.5 to 1.5% Mn, 0.5 to 3.0% Ni, and 0.1 to 1.5% Cr;
    hot-rolling the steel material to a wire with a predetermined diameter;
    cold drawing the steel wire with a predetermined reduction of area;
    heating the steel wire with a first high frequency induction heating, wherein a ferrite fraction of the cold-drawn wire's microscopic structure before the first high frequency induction heating is 40% or less to minimize deleterious effects of a ferrite component when the ferrite fraction is greater than 0% in austenization by the high frequency induction heating;
    rapid cooling the steel wire; and
    tempering the steel wire with a second high frequency induction heating.

2. The method of producing a steel wire for cold-formed coil spring according to claim 1, wherein a maximum heating temperature in the first high frequency induction heating is 940° C. or higher and 1020° C. or lower.

3. The method of producing a steel wire for cold-formed coil spring according to claim 1, wherein a maximum heating temperature in the first high frequency induction heating is 900° C. or higher and 950° C. or lower.

4. The method of producing a steel wire for cold-formed coil spring according to claim 1, wherein a holding time at a maximum heating temperature in the first high frequency induction heating is 5 to 20 seconds.

5. The method of producing a steel wire for cold-formed coil spring according to claim 1, wherein, after the first high frequency induction heating, the steel wire has a grain size number that is set to be 9 or more.

6. The method of producing a steel wire for cold-formed coil spring according to claim 1, wherein a tensile strength of the steel wire after the tempering is set to be from 1830 to 1980 MPa.

7. The method of producing a steel wire for cold-formed coil spring according to claim 1, wherein the material further comprises 0.01 to 0.025% N and 0.05 to 0.5% V, and the P content is restricted to 0.015% or less, and the S content is restricted to 0.01% or less.

8. A cold-formed coil spring made from a steel wire produced by the method of producing a steel wire for cold-formed coil spring according to claim 1.

* * * * *